A. ROSENFIELD.
Car-Brake.

No. 202,472.　　　　Patented April 16, 1878.

Attest.
Louis E. Rosenfield
Anthony Rosenfield.

Inventor.
Albert Rosenfield

UNITED STATES PATENT OFFICE.

ALBERT ROSENFIELD, OF DETROIT, MICHIGAN, ASSIGNOR TO LOUIS E. ROSENFIELD, OF SAME PLACE.

IMPROVEMENT IN CAR-BRAKES.

Specification forming part of Letters Patent No. 202,472, dated April 16, 1878; application filed August 24, 1877.

*To all whom it may concern:*

Be it known that I, ALBERT ROSENFIELD, of the city of Detroit, in the county of Wayne and the State of Michigan, have invented a new and useful Improvement in a Railroad-Brake, which improvement is fully set forth in the following specification, reference being had to the accompanying drawings, in which—

Figure 1:
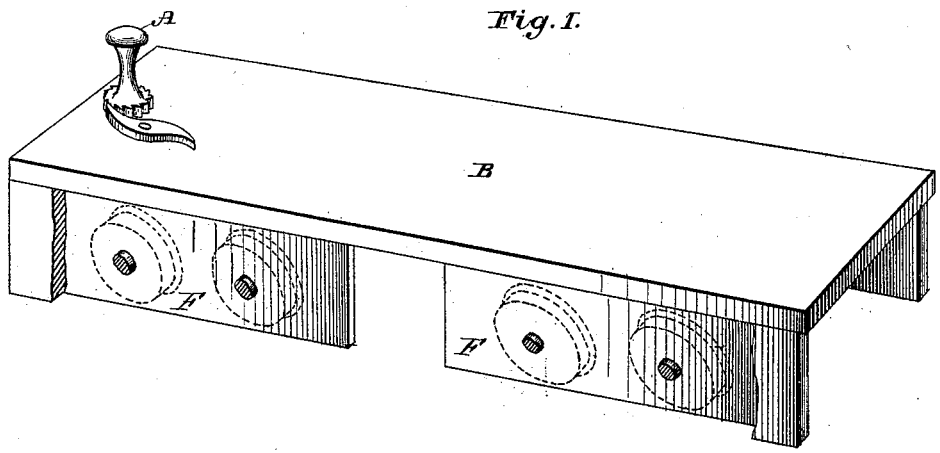
Figure 2:
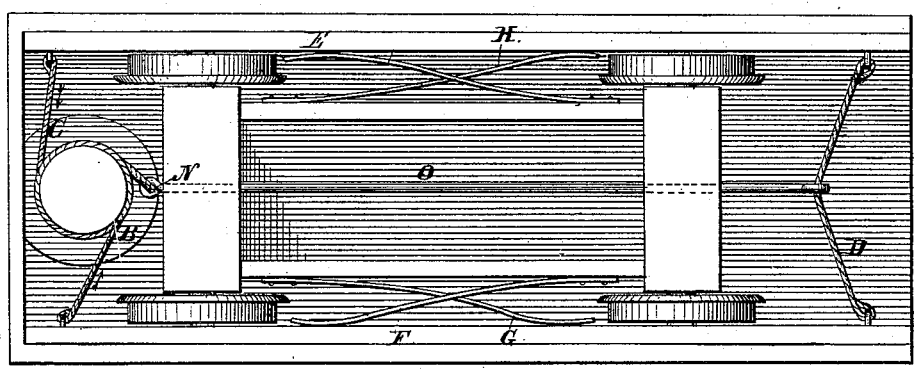

Figure 1 is a perspective view of a car having two trucks and provided with my improvement. Fig. 2 shows the under side of a car having four wheels provided with my improved brake.

The object of my invention is to reduce the speed of railroad trains or cars in motion more rapidly, bring the same to a stand-still, and save thereby human life, the rolling-stock, and other property better than it could be done by other systems now in use, by simply turning the handle A, Fig. 1, or its equivalent, on the platform B from right to left, as usual, and thereby shorten the chains C D underneath the platform, and press the side or brake boards E and F, to which these chains are fastened, against the running wheels to every one of the trucks whereon this device is applied, as shown in the perspective view, Fig. 1 of the accompanying drawing.

This machine is illustrated more in detail in the plan view of the reverse side of the machine, Fig. 2. The handle A above the platform is moved, as above said, from right to left, whereby both brake-boards on the whole length of the car are pressed at the same time against all of the wheels of the same car. The front chain B is pulled from right to left and the front chain C from left to right. The center chains N, attached to the brake-rod O, together with the rear chain D, are pulled forward, and the result of this operation must therefore necessarily be a much quicker stop of the train or car than could be effected by many other machines of this sort in use.

For long cars, as palace, sleeping, or passenger cars, &c., two brake-boards on each side are applied to each truck with the same effect as the single brake boards or beams on short ones.

In order to relieve the wheels from the pressure of the brake, it is only necessary to slacken the handle or lever A on the platform, when the springs G and H, Fig. 2, push the brake-boards back toward the stationary boards or beams on both sides of the car.

In case the long springs just mentioned could (for want of space) not be used, then round springs, similar to those used in upholstering—those rising up in the center when not pressed down—would have to be inserted between the stationary beams and the brakes, so as to produce the same effect as with the long ones.

To wheels having convex or concave moldings on their sides, as is very often the case, it would be necessary, in order to increase the friction, to apply false wheels of the same pattern of molding, in a reversed order, connected to the brake-board; and, finally, on roads having movable wheels on the axle, false wheels could be attached to the axle in a stationary way inside of the running wheels, and this would have the effect of increasing the friction.

In conclusion, be it mentioned here that, in case any of the brake-boards or brake-wheels be broken, they can, without much difficulty, be replaced from the outside of the truck; and last, but not least, may it be mentioned in this connection that two or more cars could be supplied by one and the same brake, and, without inconvenience, attached to and detached from each other.

I am aware that there is a similar improvement in existence, as shown in Patent No. 92,104, and I will therefore show, as briefly as possible, the diverging features of Scripture and Darragh's patent and my proposed improvement in the following points: While the brake-beams of the former device could touch the wheels at one small portion only, about as large as that covered by the tread or shoe-brake, in the form of a quadrant, the latter affects most of the surface of all the wheels on the outside, and, if made of wood, gives more friction and less injury to the wheels, and, even if made of iron, my device must prove more economical, as by the increased friction on all the wheels a quicker stop is reached, and therefore less strain is brought to bear on the brake-beams and wheels, and they could therefore be of lighter construction, while by the method of Scripture and Darragh one brake-beam has to be provided for each and every wheel separately, while by my arrangement one or two beams or wooden boards can be made available for all the wheels on one and the same side.

Now what I claim in my invention as new is—

1. The within-described brake, consisting of two long beams or boards extending on the outside of the truck or trucks on the right and left hand side, when so arranged that the friction-surfaces upon said beams or boards shall press directly and equally against the outer sides of the truck-wheels, substantially as shown and described.

2. The springs H G, to relieve the wheels of the friction by withdrawing the brakes, as set forth.

ALBERT ROSENFIELD.

Witnesses:
LOUIS E. ROSENFIELD,
ANTHONY ROSENFIELD,
MONROE ROSENFIELD.